United States Patent [19]

Tashiro et al.

[11] Patent Number: 5,153,010
[45] Date of Patent: * Oct. 6, 1992

[54] APPARATUS FOR CUTTING AND SHAPING A SPHERICAL BODY

[75] Inventors: Yasunori Tashiro; Kazuyoshi Onoguchi, both of Utsunomiya, Japan

[73] Assignee: Rheon Automatic Machinery Co., Ltd., Utsunomiya, Japan

[*] Notice: The portion of the term of this patent subsequent to Mar. 24, 2009 has been disclaimed.

[21] Appl. No.: 685,304

[22] Filed: Apr. 12, 1991

[30] Foreign Application Priority Data

May 1, 1990 [JP] Japan .................... 2-115574

[51] Int. Cl.⁵ .............................................. A21C 5/08
[52] U.S. Cl. ............................... 425/287; 72/468; 264/167; 425/309; 426/516
[58] Field of Search ............... 425/382 N, 287, 309, 425/516, 518; 264/167; 426/512, 516; 72/254, 255, 468

[56] References Cited

U.S. PATENT DOCUMENTS

| | | | |
|---|---|---|---|
| 1,922,770 | 8/1933 | Kornbath | 72/468 |
| 2,044,961 | 6/1936 | Waner | 264/167 |
| 2,260,479 | 10/1941 | Picking | 72/468 |
| 2,578,229 | 12/1951 | Clement et al. | 72/468 |
| 2,664,996 | 1/1954 | Andrews | 72/468 |
| 3,509,785 | 5/1970 | Fuchs, Jr. | 72/468 |
| 3,628,449 | 12/1971 | Phillips, Jr. | 72/468 |
| 3,901,641 | 8/1975 | Onder | 425/406 |
| 4,036,571 | 7/1977 | Geyer et al. | 425/562 |
| 4,251,201 | 2/1981 | Krysiak | 425/311 |
| 4,734,024 | 3/1988 | Tashiro | 425/132 |
| 4,767,304 | 8/1988 | Tashiro | 425/308 |
| 4,767,305 | 8/1988 | Tashiro | 425/308 |
| 4,882,185 | 11/1989 | Simelunas et al. | 425/133.1 |

Primary Examiner—David A. Simmons
Assistant Examiner—W. Jackson Matney, Jr.
Attorney, Agent, or Firm—Guy W. Shoup; David W. Heid

[57] ABSTRACT

An improved apparatus for cutting and shaping a spherical material, including an assembly consisting of a number of rotary polygonal members for forming and closing an opening at their center to pass the material through the opening and cut and shape it. Each of the members has curved sides that abut each other when the members close the opening. The first side has a convex surface, and the second side has a concave surface. Each member is associated with each other such that the tip of each member tracks the convex surface of an adjacent member and when the members close the opening, the convex surface engages the concave surface so that substantially spherical products bearing no uneven flower patterns on their outer cover can be produced without any interruption of the operation of the apparatus caused by powder burning and sticking to the polygonal members.

18 Claims, 9 Drawing Sheets

FIG. 11
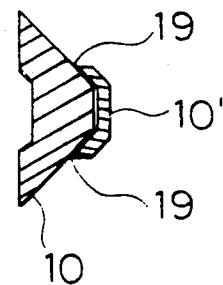
FIG. 12A  FIG. 12B  FIG. 12C
  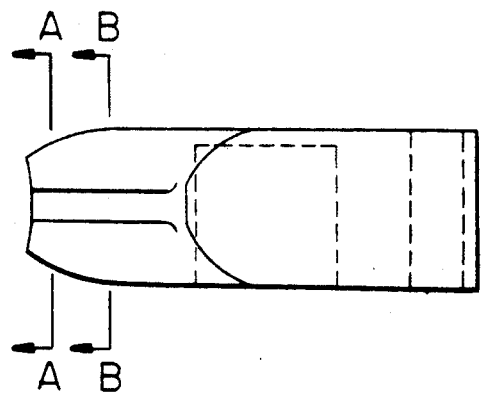
A—A  B—B
FIG. 13
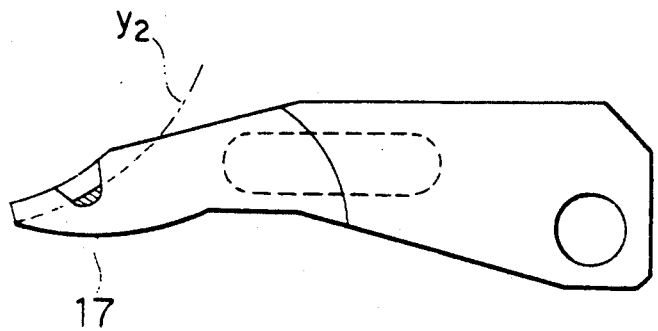

FIG. 14
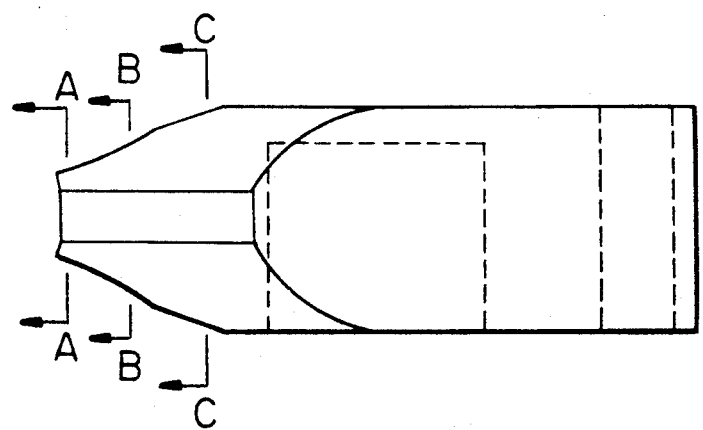
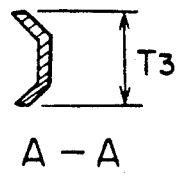
FIG. 15A
A−A
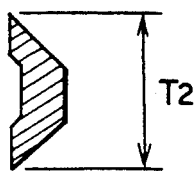
FIG. 15B
B−B
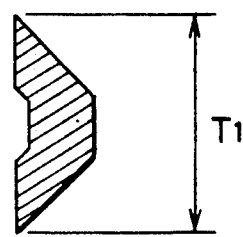
FIG. 15C
C−C

APPARATUS FOR CUTTING AND SHAPING A SPHERICAL BODY

TECHNICAL FIELD

This invention is in general concerned with an apparatus for cutting and shaping a spherical body. It is particularly useful for shaping a substantially round food product consisting of dough and filling materials without generating the problems of flower-like patterns being formed on the outer cover of the product or burnt powder sticking to the apparatus when powder is applied, as well as the problem of a filling protruding from the dough.

BACKGROUND OF THE INVENTION

Various methods have been taught of cutting and shaping an enveloped bun-like body by using a continuously fed two-layer material such as is disclosed in U.S. Pat. No. 4,734,024. For instance, it discloses an apparatus for shaping a round body consisting of a dough coating and a filling, which comprises an assembly comprising a plurality of circumferentially disposed members combined to shape a spheroidal body. Each of the members has at least two sliding surfaces, and they are so combined that a sliding surface of one member is slidable on a sliding surface of another member, that by sliding the members an opening is formed or closed in the center of the assembly, and that the opening is confined by walls consisting of the inwardly exposed part of the sliding surfaces of the members and is of a cross-sectional area, when the opening is fully open, sufficient to pass a descending cylindrical body.

While shaping a spheroidal body by the assembly of slidable members of the prior art is effective, particularly in precluding a member from intruding into the body and thereby breaking the outer layer of the cylindrical body, it has certain disadvantages. Because of the structural conditions of the assembly, the number of slidable members is limited up to about six, so that only polygonally-shaped products have been obtained. Therefore, the external appearance of these polygonal products falls far below that of those hand-shaped spheroidal ones.

Although cutting and shaping spheroidal products is possible without exposing their fillings, due to mechanical and dimensional imperfections in both the slidable members and in their assembly, a flower-like pattern is formed on the outer cover when a bar-shaped dough is cut. If a product with an even and smooth outer cover is to be produced, the product must be finished through additional manual work or other means. Further, conventional apparatuses could not be used for those products that require powdering. This is because if powdering is carried out when a bar-shaped dough is processed through a conventional apparatus, powders burn due to friction between slidable members and stick to the blades of the assembly and interrupt the operation.

Accordingly, it is an object of the subject invention to provide an improved apparatus for cutting and shaping a substantially spherical product.

It is another object of the subject invention to provide an improved apparatus for cutting and shaping a spherical product using a new shutter or iris assembly mechanism comprising a number of rotatable polygonal members.

It is a further object of the subject invention to provide an improved apparatus for cutting and shaping a spherical product which eliminates flower-like patterns formed on the outer cover of the product, due to new and specially designed polygonal members.

It is still another object of the subject invention to provide an improved apparatus for cutting and shaping a spherical product free from any interruption of the operation caused by powder burning and sticking to the blades when powdering is applied during the cutting process by using new and specially designed polygonal members, and new and specially designed driving mechanisms.

SUMMARY OF THE INVENTION

In accordance with those and other objects, this invention provides an improved apparatus for cutting out and shaping a spherical material, comprising an assembly consisting of a plurality of identically-shaped polygonal members, pivotally fitted to fulcrums that are equidistantly disposed on a circle to collectively and radially form an opening to pass a cylindrical material therethrough at the center of the circle, and to close the opening to cut and shape a spherical material.

Each of the members has a blade 17 comprising first and second curved sides abutting each other at the tip positioned opposite the fulcrum. The first curved side comprises a convex surface formed such that when the members swing toward the center of the circle to confine the material passing through the opening, it faces the material, and the second curved side comprises a concave surface complementary to the convex surface. The members are associated with each other such that the tip of each member tracks the convex surface of the first curved side of the blade of an adjacent member, and when the tips of all polygonal members converge at the center of the circle so as to close the opening, the convex surface of each member engages the concave surface of an adjacent member over an area near the tip.

In a preferred embodiment, each of the first and second curved sides $y_1$ and $y_2$ forms an arc of a circle with a radius equal to the distance $a'$ between adjacent fulcrums. When the tip of a member is at the center of the circle, the center of the arc of the first curved side $y_1$ is at the same time located at a distance from the fulcrum of the member that is equal to the radius of the circle and at a distance from the center of the circle that is equal to the distance $a'$, and the center of the arc of the second curved side $y_2$ is at the same time located at a distance from the fulcrum of the member next in the direction going from $y_1$ to $y_2$ that is equal to the radius of the circle and at a distance from the center of the circle that is equal to the distance $a'$.

In other preferred embodiments, the first curved side of the blade has an arcuate cross section or a trapezoidal cross section.

In other preferred embodiments, the ridgelines of the first curved side of the blade are beveled or have arcuate cross sections.

In further preferred embodiments, the first curved side of the blade has a thickness that decreases toward an edge, which has a predetermined thickness.

In still other preferred embodiments, the first curved side of the blade has a thickness that nonequiangularly decreases toward the edge, which has a predetermined thickness.

BRIEF DESCRIPTION OF THE DRAWINGS

FIG. 11 is a cross section of an abutting pair of polygonal members.

FIG. 12A-C is a side view and cross sections of a polygonal member of an embodiment.

FIG. 13 is a top view of a polygonal member of another embodiment.

FIG. 14 is a side view of a polygonal member of a further embodiment.

FIG. 15A-C shows a cross section of the polygonal member shown in FIG. 14.

DETAILED DESCRIPTION OF THE INVENTION

Figure 1:
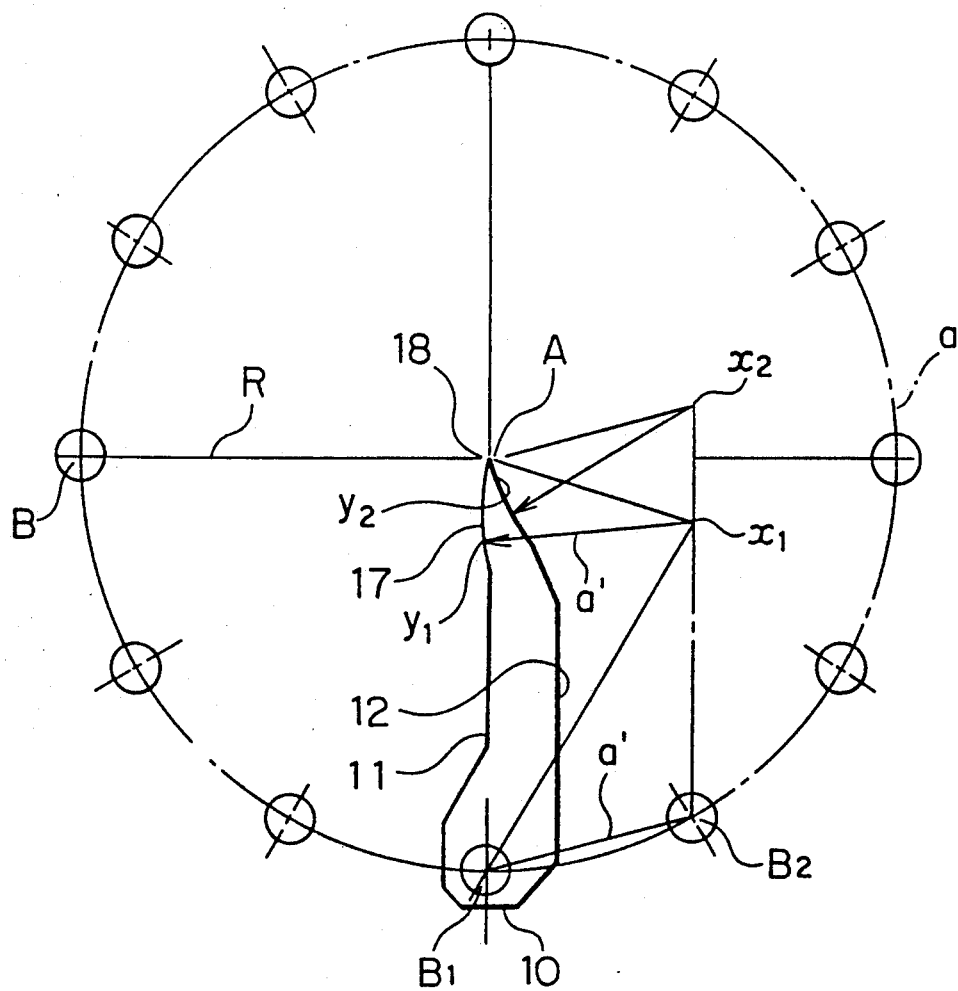
FIG. 1 is a simplified view of an assembly of polygonal members, of which only one is shown, for forming an opening to cut a material passing through it.

Referring to FIG. 1, the feature of polygonal members 10 constituting the shutter mechanism of this invention is shown.

Fulcrums B are equidistantly disposed on a circle with a radius R around the center A. To each fulcrum a polygonal member is pivotally fitted.

The distance between a pair of adjacent fulcrums $B_1$ and $B_2$ is represented by $a'$.

A curve $y_1$ is an arc of a circle whose radius is equal to the distance $a'$ and whose center $x_1$ is at the same time located at a distance from the fulcrum $B_1$ that is equal to the radius R and at a distance from the center A that is equal to the distance $a'$.

The curve $y_1$ defines a first side of the blade of the polygonal member and constitutes the main envelope of the blade 17. The first side contacts and cuts a material passing through an opening between the members 10.

The first side $y_1$, in cross section, has a convex surface E, as shown in FIG. 12.

A curve $y_2$ is an arc of a circle whose radius is equal to the distance $a'$ and whose center $x_2$ is at the same time located at a distance from the fulcrum $B_2$ that is equal to the radius R and at a distance from the center A that is equal to the distance $a'$.

The curve $y_2$ defines a second side of the blade of the polygonal member and is positioned opposite to the first side $y_1$, forming a tip 18 of the blade 17 therebetween. The second side $y_2$ has a concave surface D that is complementary to and engages the convex surface E. The convex surface of the first side $y_1$ is tracked by the tip 18 of an adjacent polygonal member 10, and abuts the concave surface D of the second side $y_2$ of the blade 17 of an adjacent polygonal member 10 when the opening is closed.

Figure 2:
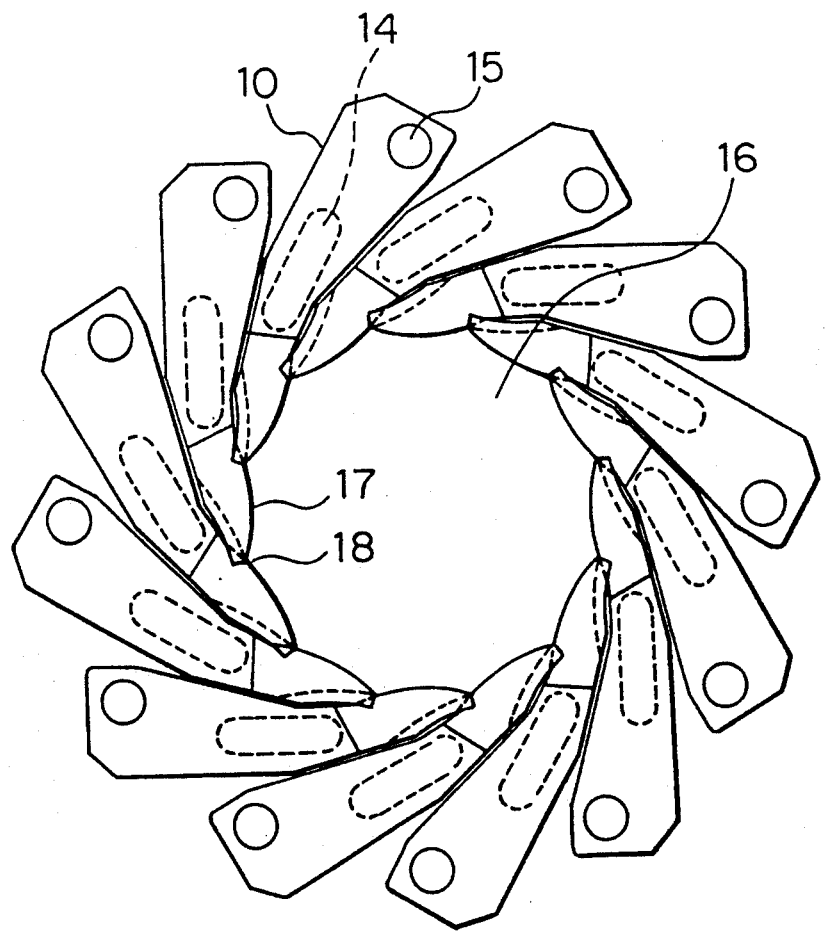
FIG. 2 is a schematic plan view of the assembled polygonal members, when the opening is formed.
Figure 3:
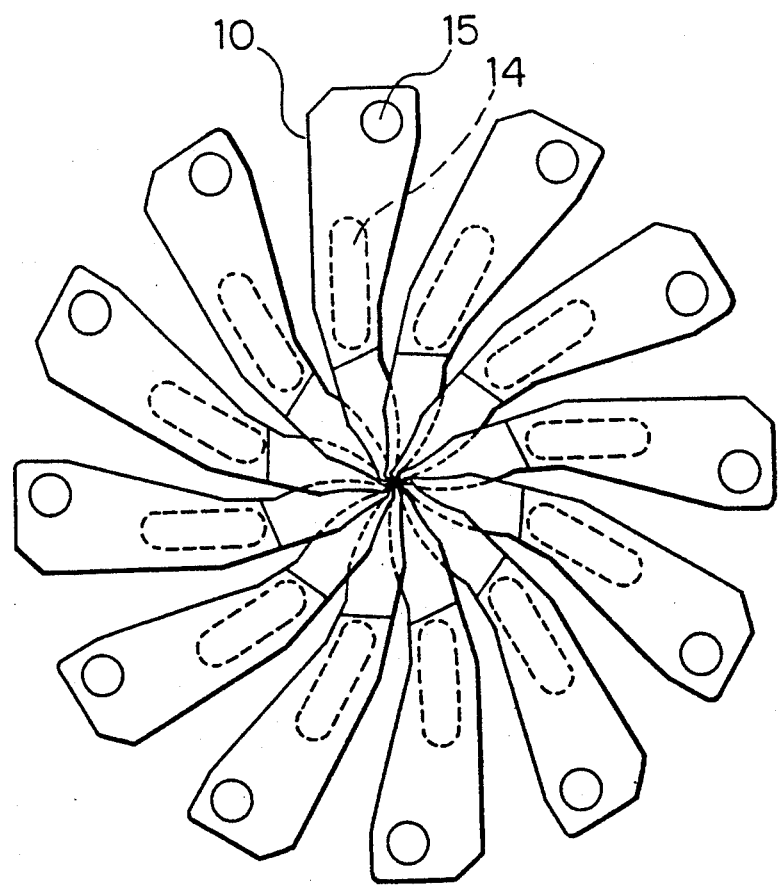
FIG. 3 is a schematic plan view of the assembled polygonal members, when the opening is closed.
Figure 4:
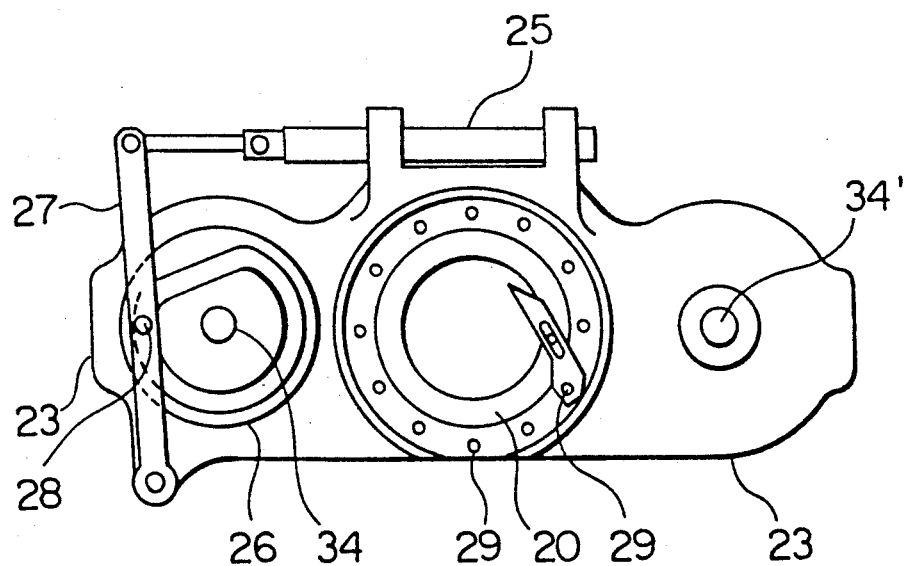
FIG. 4 is a top view of a base.
Figure 5:
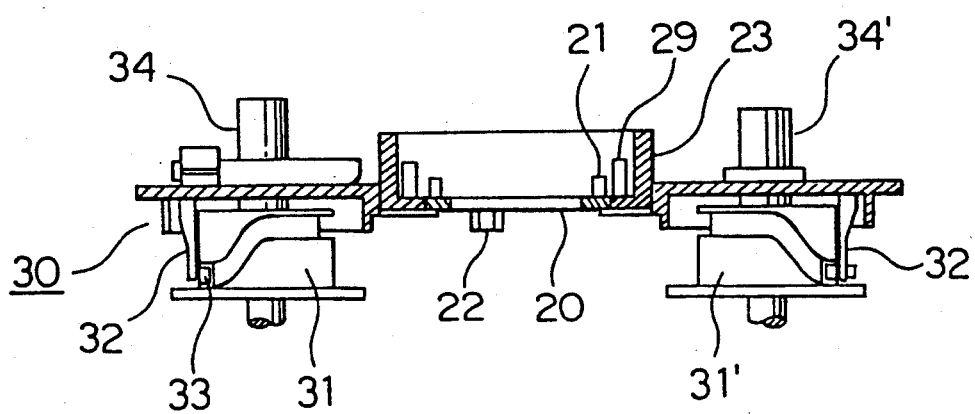
FIG. 5 is a front view of a cross section of the base.
Figure 6:
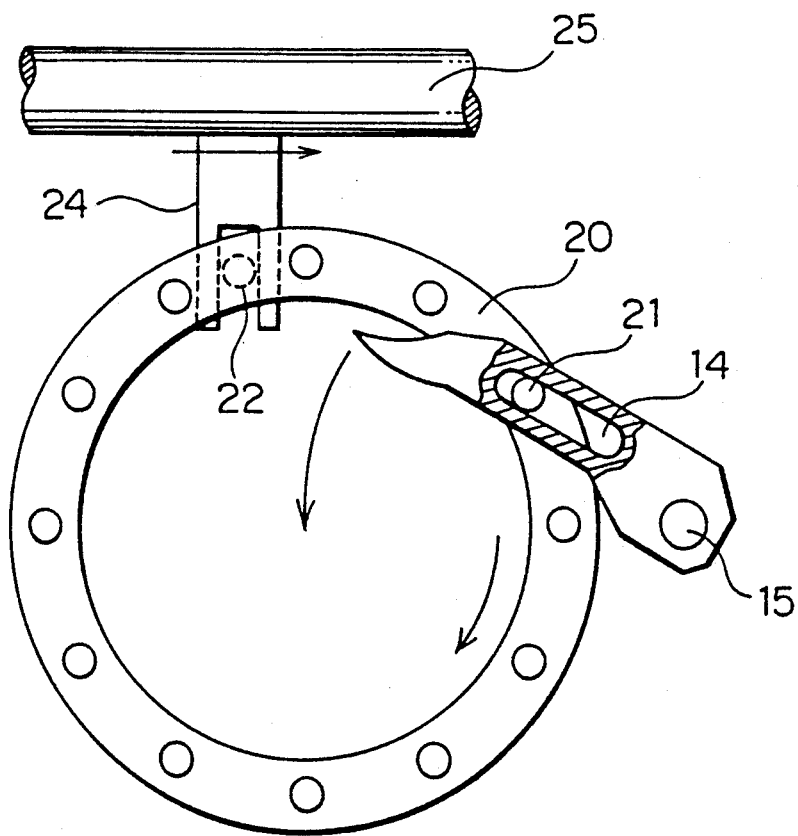
FIG. 6 is a top view of a transmission mechanism for driving the polygonal members.
Figure 7:
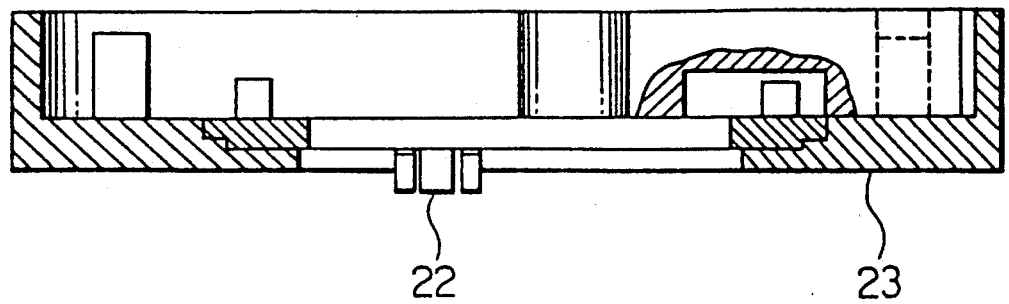
FIG. 7 is an enlarged view of a partial cross section of the base.

Sides 11 and 12 of the neck of the polygonal member are formed such that there is no interference between any adjacent polygonal members during the course of the rotation of each polygonal member from and to the positions shown in FIGS. 2 and 3. A hole 15 is provided at the end of the member 10 away from the tip 18, and receives a shaft 29 at the fulcrum $B_1$. An elongated blind hole 14 is provided in the neck of each member, as shown in FIGS. 2 and 3, and receives a pin 21 as shown in FIGS. 5 and 6.

Referring to FIGS. 4-7, the mechanism for driving the polygonal members 10 will now be explained. These polygonal members 10 are fitted, through the holes 15 provided therein, into supporting shafts 29 provided on a base 23. Actuating pins 21 are mounted on an annular rotating plate 20 that fits in the base 23 and that slidably rotates on the base, and are loosely fitted into elongated holes 14 in the members. A driving pin 22 for driving the rotating plate 20 extends downward from the bottom of the rotating plate 20, and is held between two arms formed at an end of a guide bar 24, which is connected to a rod 25.

One end of the rod 25 is pivotally connected to one end of an arm 27, the other end of which is pivotally fitted to a pin upwardly extending from the base 23. A cam follower 28 mounted to a part in the middle of the arm 27 engages a groove on a cam 26 that is mounted to, and rotates on, the base, and is connected to a motor (not shown). The cam 26 is driven by a driving shaft 34 that extends through the left side of the base. Therefore, when the driving shaft 34 rotates, the cam 26 moves the cam follower 28 to move the arm 27 and the connected rod 25. The rod 25 causes the guide bar 24 to actuate the driving pin 22, so that the rotating plate 20 rotates to rotate the polygonal members 10.

The base is arranged so that it can move up and down. A driving shaft 34', a counterpart of the driving shaft 34, is symmetrically provided on the right side of the base. Each of these driving shafts 34 and 34' are equipped with a cam 31, 31'. A cam follower 33, mounted on an arm 32 extending from the base 23, is fitted into each of the grooves circumferentially provided on the cams 31 and 31'. When the cams 31 and 31' rotate, the base is made to go up and down by the cam followers 33 guided by the cams.

As is explained above, the opening provided by the polygonal members is opened and closed through the rotation of the cam 26. This opening and closing movement is synchronized with the up and down movement of the base.

Due to the structure of such rotary polygonal members that are free from mutual interference between any adjacent members when they rotate, the restriction on the number of the shafts 29 that can be mounted on a frame is reduced. As a result of this, by mounting a large number of polygonal members on a frame, forming a product that is almost a sphere has been achieved. Although the embodiment of this invention shows only twelve polygonal members in an assembly, it is obvious that the assembly equipped with more polygonal members will be more effective in producing a spherical product.

The cutting functions and effects of the apparatus of this invention will now be described by reference to FIGS. 8-15.

Figure 8A:
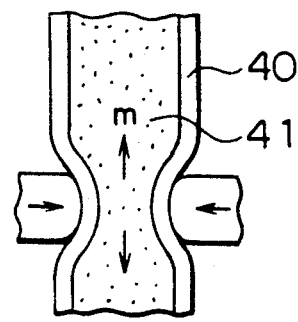
FIGS. 8A-C, 9A-C, and 10A-C are schematic cross sections of the material and polygonal members showing stepwise the process and effects of cutting out a spherical body.
Figure 8B:
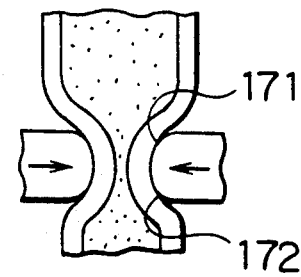
Figure 8C:
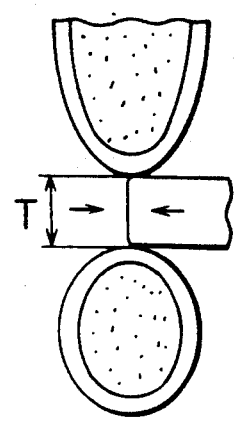
Figure 9A:
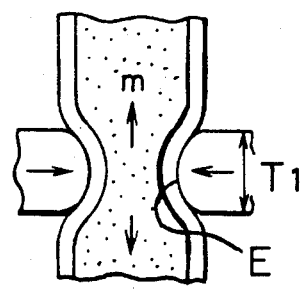
Figure 9B:
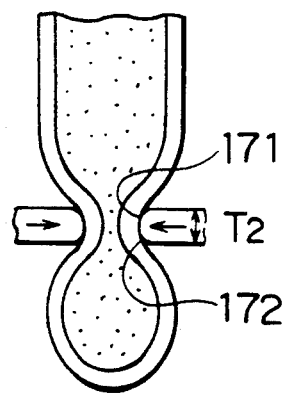
Figure 9C:
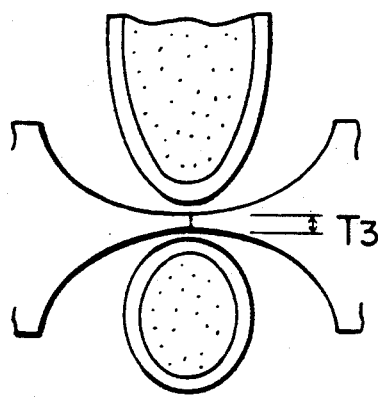
Figure 10A:
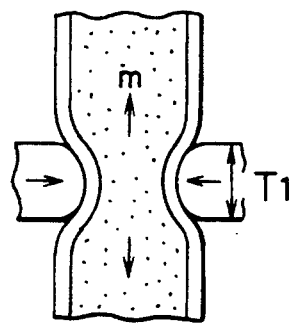
Figure 10B:
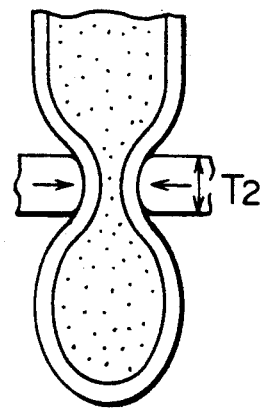
Figure 10C:
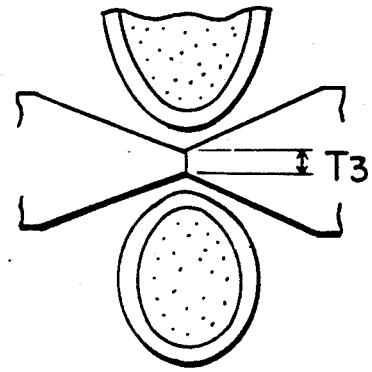

FIGS. 8, 9, and 10 show cross sections of a continuous bar of a two-layer material consisting of a coating 40 consisting of dough with a filling 41. The continuous bar is in contact with the blades 17 of the polygonal members, and is finally cut off when their tips 18 meet at the center of the assembly. The contour of the blade 17 in cross section differs depending on the characteristic of the material to be cut. FIG. 8 shows a blade with a constant thickness T and a uniform contour at all parts of the blade. Each of the surfaces of the first and second sides in cross section forms an arc throughout the blade. FIG. 9 shows a blade that has a thickness that nonequiangularly decreases toward the tip 18 (see FIG. 9C). The first side is arcuate in cross section as in the blade of FIG. 8, but the thickness decreases steeply from the neck of the member to a middle part of the blade and then gently decreases to a point near the tip 18, whereafter the thickness is unchanged. FIG. 10 shows a blade, the thickness of which equiangularly decreases toward the tip 18 that has a predetermined thickness $T_3$ (see FIG. 10 C).

In FIGS. 8A, 8B, and 8C, the blades of the polygonal members contact the coating 40 of the cylindrical two-layer dough bar, and move the coating 40 to the center of the dough bar, with the thickness T of the blade kept constant. When the opening is closed, the tips of the members with a prescribed thickness all abut each other at the center of the assembly. When the blades all abut each other at the center of the assembly as shown in FIG. 8C, the moved dough is pressed aside into the upper and lower parts of the bar while completely enveloping the filling 41 at the time of separation. When the upper and lower parts 171 and 172 of the first side of the blade, forming a convex surface E with no acute angles, move toward the center, a certain amount of dough coating is moved toward the center to have the filling flow in the directions shown by arrows m, and the contact surface area of the neck that is formed by the dough being pressed in all directions is reduced, so that cutting is possible without decreasing the thickness of the coating 40 and without exposing the filling.

FIGS. 9 and 10 show stepwise (from $T_1$ to $T_2$ and then to $T_3$) the effects of the blade of the other embodiments of this invention, wherein the parts of the dough coating in contact with the blades in cross section decrease in proportion to the decrease in the area of the opening.

The shape of the blade shown in FIG. 9 is particularly effective for materials with thin, soft coatings. Namely, if a material to be cut has such a coating, the coatings will not spread sufficiently at the later stage of the cutting process, so that there is a possibility of the filling being exposed. To avoid this, at the later stage of the process, the coating, which has been moved to the central part of the cylindrical two-layer dough bar in a comparatively large quantity, spreads slowly, with the contact area gradually decreasing so as to stabilize the spread of the coating.

The shape of the blade shown in FIG. 10 can cut comparatively high elastic materials without exposing their fillings.

FIG. 11 illustrates the unique effect of the associated polygonal members of this invention on the elimination of flower patterns that have been inevitably formed on the outer cover of those products produced by using conventional slidable members.

During the above-mentioned stepwise process the convex surface E of the first side $y_1$ of each blade 17 engages the second side $y_2$ of the blade 17 of an adjacent polygonal member 10' forming the concave surface D complementary to the convex surface E, so as to provide abutting surfaces 19 between the abutting adjacent polygonal members which have substantially no gaps therebetween.

As a result of the tight engagement of the blades of adjacent polygonal members having no gaps therebetween, no flower patterns will be formed on the outer cover of the product produced by using the polygonal members of this invention.

We have explained the embodiments of the polygonal members of this invention, the blades of which have a first side with a symmetrical angular reduction rate in their upper and lower parts 171 and 172. However, if we use those blades whose first side with upper and lower parts have different angular reduction rates, the thickness of the outer covers of the products can be adjusted, if necessary, at the upper, side, or lower part of the products.

At the right side of FIG. 12 is shown a side view of a polygonal member, and at the left side are shown cross sections A—A and B—B of the member cut along the lines A—A and B—B respectively shown in the side view. The cross sections are defined by convex surfaces E and concave surfaces D.

FIGS. 13, 14, and 15 show another embodiment of the polygonal member of this invention, wherein the top and side views and the cross sections of the blade comprising convex and concave surfaces are illustrated.

Further, the shutter mechanism in a conventional apparatus could not help but be interrupted by powders, which burn and stick to the sliding surfaces of the shutter when powder is applied to the shutter. The apparatus of this invention prevents burnt powders from sticking to the blades by scraping them with the tips of the polygonal members so that there is no possibility of polygonal members being interrupted by such burnt and stuck powders.

As is explained above, by providing various shapes of polygonal members according to the characteristics of continuous bars, the apparatus of this invention can produce a substantially spherical product completely covered by smooth outer covers without producing uneven flower patterns thereon.

The invention provides an apparatus comprising improved polygonal members so as to continuously produce neatly-shaped products without any interruption of the operation of the apparatus caused by powder burning and sticking to the polygonal members when powder is used.

We claim:
1. An apparatus for cutting and shaping a spherical material comprising:
   a base defining an opening;
   a plurality of supports fixedly disposed on said base equidistantly spaced around the opening in the form of a circle, the circle defining an imaginary central point; and
   a plurality of identically-shaped polygonal members, each of the plurality of members having a first end pivotally connected to an associated one of the plurality of supports, and each of the plurality of members having a second end defining a tip, each of the plurality of members defining a closed position wherein the tip is disposed at the central point and an open position wherein said tip is disposed away from the central point, each of the plurality of members defining a first curved side facing the central point and a second curved side facing away from the central point when the plurality of members are in the open position, the tip of each of the plurality of members abutting the second curved side of an adjacent one of the plurality of members when the plurality of members are in the open position, the first curved side of each of the plurality of members abutting the second curved side of an adjacent one of the plurality of members when the plurality of members are in the closed position, the tip of each of plurality of members sliding against the second curved side of an adjacent on one of the plurality of members while the plurality of members collectively reciprocate between the open position and the closes position;

wherein the second curved side of each of the plurality of members defines a concave surface, and the tip and first curved side of each of the plurality of members defines a convex surface complementary to the concave surface such that each tip slides within the second curved side wheel the plurality of members reciprocate between the open position and the closed position.

2. The apparatus of claim 1, wherein each of the first and second curved sides forms an arc of a circle with a radius equal to the distance between the adjacent ones of the plurality of supports, and when the tip of a member is at the central point, the center of the arc of the first curved side is at the same time located at a distance from the support connected to the first end of the adjacent member that is equal to the distance between the tip of a member and the support connected to the member, and at a distance from the central point that is equal to the distance between the adjacent ones of the plurality of supports, and the center of the arc of the second curved side is at the same time located at a distance from the support connected to the member that is next in the direction going from the first to the second curved side that is equal to the distance between the tip and of a member and the support connected to the member, and at a distance from the central point that is equal to the distance between adjacent ones of the plurality of supports.

3. The apparatus of claim 1, wherein the first curved side has an arcuate cross section.

4. The apparatus of claim 1, wherein the first curved side has a trapezoidal cross section.

5. The apparatus of claim 1, wherein the first curved side has a uniform thickness except for the area near the tip thereof, where the thickness decreases toward the tip.

6. The apparatus of claim 1, wherein the first curved side has a thickness that decreases toward the tip at a non-uniform rate.

7. The apparatus of claim 1, wherein the first curved side has a thickness that decreases toward the tip, which has a thickness.

8. The apparatus of claim 2, wherein the first curved side has an arcuate cross section.

9. The apparatus of claim 2, wherein the first curved side has a trapezoidal cross section.

10. The apparatus of claim 2, wherein the first curved side has a uniform thickness except for the area near the tip thereof, where the thickness decreases toward the tip.

11. The apparatus of claim 2, wherein the first curved side has a thickness that decreases toward the tip at a non-uniform rate.

12. The apparatus of claim 2, wherein the first curved side has a thickness that decreases toward the tip, which has a thickness.

13. The apparatus of claim 3, wherein the first curved side has a uniform thickness except for the area near the tip thereof, where the thickness decreases toward the tip.

14. The apparatus of claim 3, wherein the first curved side has a thickness that decreases toward the tip at a non-uniform rate.

15. The apparatus of claim 3, wherein the first curved side has a thickness that decreases toward the tip, which has a thickness.

16. The apparatus of claim 4, wherein the first curved side has a uniform thickness except for the area near the tip thereof, where the thickness decreases toward the tip.

17. The apparatus of claim 4, wherein the first curved side has a thickness that decreases toward the tip at a non-uniform rate.

18. The apparatus of claim 4, wherein the first curved side has a thickness that decreases toward the tip, which has a thickness.

* * * * *